| (12) United States Patent
Chan et al. | (10) Patent No.: US 10,380,107 B2
(45) Date of Patent: Aug. 13, 2019 |

(54) DEVICE TYPE MANAGER

(71) Applicant: Yokogawa Electric Corporation, Tokyo (JP)

(72) Inventors: Sin Wai Chan, Singapore (SG); Mamerto Giango, Singapore (SG); Maryann Concepcion Prosia, Singapore (SG); Shankar Rajappa, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 669 days.

(21) Appl. No.: 14/927,557

(22) Filed: Oct. 30, 2015

(65) Prior Publication Data

US 2017/0124145 A1     May 4, 2017

(51) Int. Cl.
*G06F 17/30*      (2006.01)
*G06F 16/245*     (2019.01)
*G06F 9/445*      (2018.01)
*G06F 8/658*      (2018.01)

(52) U.S. Cl.
CPC ............ *G06F 16/245* (2019.01); *G06F 8/658* (2018.02); *G06F 9/44505* (2013.01)

(58) Field of Classification Search
CPC ......... G06F 17/30929; G06F 17/30179; G06F 17/30424; G06F 8/658; G06F 8/68; G06F 9/44505
See application file for complete search history.

(56) References Cited

U.S. PATENT DOCUMENTS

| 7,002,265 B2 * | 2/2006 | Potega | B60L 11/185 307/149 |
| 2008/0313629 A1 * | 12/2008 | Vetter | G06F 8/61 717/174 |
| 2009/0292995 A1 * | 11/2009 | Anne | H04L 12/413 715/736 |
| 2009/0319061 A1 * | 12/2009 | Schwalbe | G05B 19/056 700/79 |

\* cited by examiner

*Primary Examiner* — Tyler J Torgrimson
(74) *Attorney, Agent, or Firm* — Sughrue Mion, PLLC (57) ABSTRACT

A system, method, and an apparatus related to a standardized interface to separate new functions from the primary features of the DTM. This can circumvent the need for modification of the DTM when new functions are desired to be added. This can prevent the necessity of regression testing for existing functions in the DTM, and prevent risk of degradation of performance of the DTM after addition of the new functions. Consequently, by reducing the testing time, development time of upgrades to DTMs can be shortened and a lower cost can be achieved.

9 Claims, 6 Drawing Sheets

DEVICE TYPE MANAGER

FIELD OF THE INVENTION

Exemplary embodiments relate to field device communications systems and methods, user interfaces, and the monitoring of industrial automation processes.

BACKGROUND

In the related art within industrial plant environments, particularly those utilizing Industrial Automation (IA), field devices are used to measure physical properties, quantities, or characteristics, such as flow rate, temperature, level, or pressure. Additionally, field devices can be used to modify these physical properties for the purpose of controlling the process or providing safeguards to the IA process.

In some cases of providing safeguards to the IA process, the field devices can be configured to notify a user or system of excessive measured physical values, and triggering an alarm based on the conditions or notifying device diagnostics.

Software is being developed to leverage advanced capabilities of such field devices in addition to performing basic configuration and calibration of the field device. Software functions can use different industrial standards, such as FDT and DD, to configure the field devices.

One software standard group is the FDT Group that has an FDT standard with an aim of standardizing a communication and configuration interface between field devices and host systems. The FDT standard is intended to provide a common environment for accessing the field devices' more advanced features. As such, any device can be configured, operated, and maintained through a standardized user interface, regardless of supplier, type, or communication protocol.

Within the FDT standard, the software application for the field devices are referred as a Device Type Manager (DTM). The DTM is a software component for a device that contains device-specific data, functions and logic elements. DTMs can range from a simple graphical user interface for setting device parameters to a highly sophisticated application that, for example, can perform complex calculations for diagnostics and maintenance purposes or can implement arbitrarily complex business logics for device calibration.

Each DTM can have one or more functions, such as:
- Observing device status;
- Reading device diagnostics;
- Showing device values (values in the field and additional parameters);
- Calibrating the device;
- Testing device and storing results as history;
- Displaying trend;
- Reporting on the device;
- Performing device testing;
- Performing device simulation; and
- (Other OEM service functions such as firmware upgrading).

A field device can have one or more associated DTMs. The DTM is hosted by an FDT Frame Application or Host System.

There are also some scenarios where the same function needs to be both integrated to a DTM and also implemented as a standalone application. In other words, the function can be an application on its own. In such a case, the function can be written as a component (software code/file). The component is the same when integrated to a DTM and as a standalone application. When the function is integrated to an application (DTM or standalone application), the application is referred to as a function host.

The DTM which hosts the function is eventually hosted by an FDT Frame Application/Host System. Different function hosts have different architectures, for e.g. host can be a standalone device maintenance application, a device software library (e.g. DTM). In general different hosts may have different approaches to host new functions.

When making changes to a DTM, such as adding a new function, care must be taken to prevent degradation in the performance of the DTM, and impact to other existing functions of the DTM.

Figure 1:
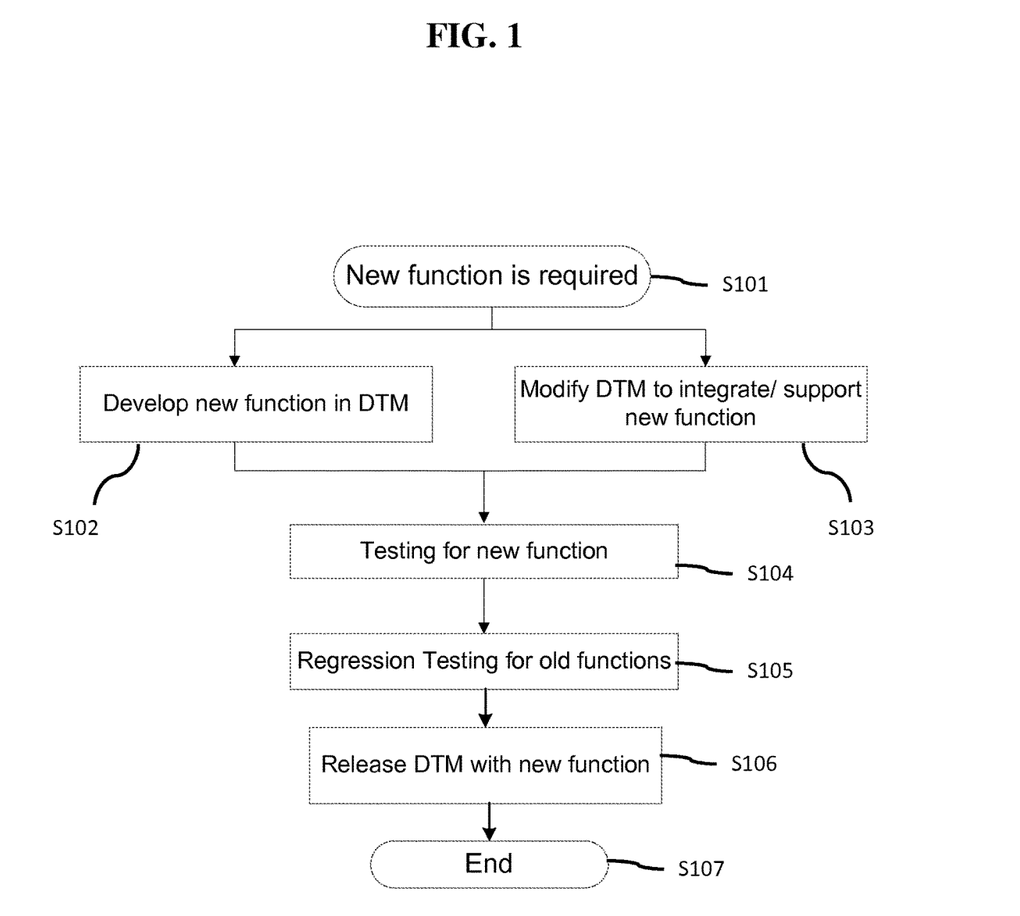
FIG. 1 illustrates a flowchart of a related-art method of modifying a DTM in view of a new function.

FIG. 1 shows a related art example when a new function is necessary for a field device. When a new function is needed for a DTM (S101), a new function is developed in the DTM (S102) and the DTM is modified to integrate the new function (S103). After the new function is developed and integrated, the new function is tested (S104). After the new function is tested, there is regression testing of the old functions (S105) in the DTM to ensure no degradation has occurred to the old functions due to the modification of the DTM. If the DTM is acceptable, then the DTM can be released for use with the new function (S106) to end the update process (S107).

SUMMARY

One or more embodiments relate to a DTM having a standardized interface and that separates the primary DTM features and device specific advanced features.

In the usual DTM, when different functions are implemented for a device type, the entire software of the DTM needs to be modified and re-compiled. This results in additional efforts for regression testing to check for performance degradation of the DTM after modification with the new function. For example, if a DTM has 3 functions, and two new functions are developed, testing must be run on all of the functions, old and new.

From an end user or consumer perspective, the modification and testing required for updating DTMs lead to a long time to market, high IT efforts to deploy updated versions of software, and risk of breakage or degradation of existing functions of the DTM.

However, the functions are dependent on device type and not dependent on the protocol that the device supports. A function which has been developed for a type of device usually can be used for all protocols supported by the device.

One or more embodiments of the disclosure relate to a standardized interface to separate new functions from the primary features of the DTM. This can circumvent the need for modification of the DTM when new functions are desired to be added. This can prevent the necessity of regression testing for existing functions in the DTM, and prevent risk of degradation of performance of the DTM after addition of the new functions. Consequently, by reducing the testing time, development time of upgrades to DTMs can be shortened and a lower cost can be achieved.

One or more embodiments of the disclosure allow for parallel or overlapping development of multiple new functions. As the new functions are separate from the primary DTM features, parallel development on new functions can occur without risk of degradation of the primary DTM features. In this way, continuous integration of new functions can be achieved without limitations on when development can occur.

In some embodiments, the new functions can be independently updated and released for inclusion with the DTM.

Also, by separating the new functions, specific functions can be made licensable without changing the DTM installation process.

As such, embodiments of the disclosure allow for a one-time implementation effort to support the DTM in the system. Additionally, as the implementation of the DTM and its primary DTM features will be untouched, there is significantly reduced testing effort for the DTM.

Embodiments of the specification provide for implementation of the new functions across a variety of different systems with less effort for integration and operation.

In some embodiments, the functions can support different kinds of licensing schemes, such as time-based or node-based.

One or more embodiments provide functions that can support dynamically computed data or persisted data via the host using the standardized interface.

The system includes at least one non-transitory computer readable medium operable to store program code and at least one processor operable to read the program code and operate as instructed by the program code.

One or more embodiments of the disclosure relate to system comprising at least one host for communicating with at least one field device. The system includes a field device, a host, a function; and a function configuration database. The host includes a business logic, a function adapter, and a function provider. Also, the function configuration database includes a list of available functions, wherein the function provider communicates with the function configuration database to look up the function and the function adapter provides an interface to interact with the function with the business logic.

According to an embodiment of the disclosure, the host is a device type manager of the FDT Group standard.

In some embodiments, the function is stored separately from the host.

In addition, the function configuration database may comprise path look up information for the function.

One or more embodiments of the disclosure relate to an apparatus for communicating with at least one field device. The apparatus includes a host, the host including a business logic, a function adapter, and a function provider. Embodiments of the disclosure include wherein the function provider is configured to communicate with a function configuration database, the function configuration database comprising a list of available functions, and the function adapter provides an interface to interact with the function with the business logic.

According to an embodiment of the disclosure, the host is a device type manager of the FDT Group standard.

In some embodiments, the function is stored separately from the host.

In addition, the function configuration database may comprise path look up information for the function.

One or more embodiments of the disclosure relate to a system comprising at least one host for executing a function. The system includes a host, a function; and a function configuration database. The host includes a business logic, a function adapter, and a function provider. Also, the function configuration database includes a list of available functions, wherein the function provider communicates with the function configuration database to look up the function and the function adapter provides an interface to interact with the function with the business logic.

According to an embodiment of the disclosure, the host is a device type manager of the FDT Group standard.

In some embodiments, the function is stored separately from the host.

In addition, the function configuration database may comprise path look up information for the function.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In contrast to the existing method of modifying the DTM, thereby requiring extensive testing of the DTM, the DTM separating new functions from the primary features of the DTM in accordance with the present disclosure can reduce development and testing time for new functions.

Figure 2A:
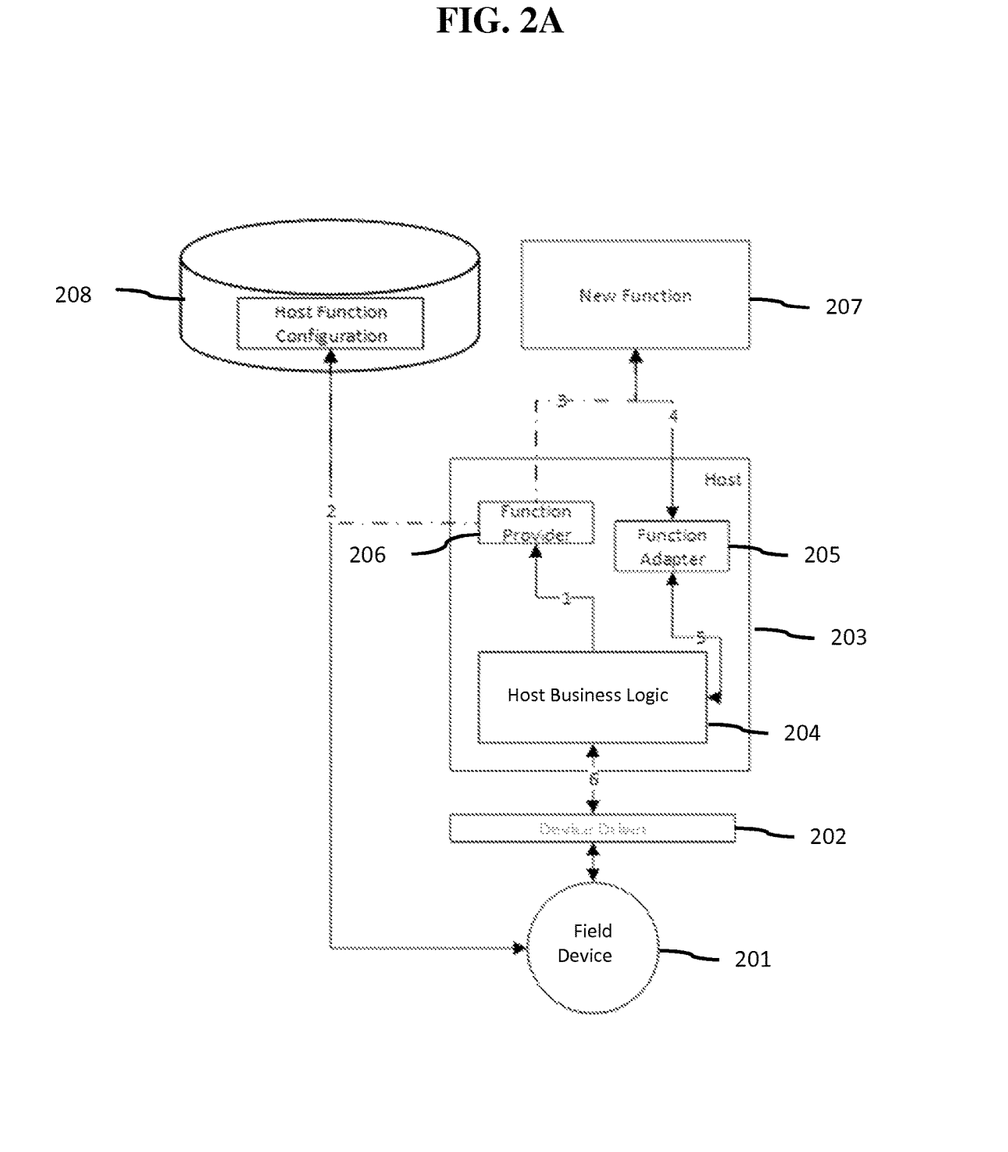
FIGS. 2A and 2B illustrate exemplary embodiments of a DTM host interaction with a new function.

FIGS. 2A and 2B show exemplary system architectures for a host interaction with a new function. According to an exemplary embodiment in FIG. 2A, the host (203) may be a DTM or a standalone application. The architecture comprises a field device (201) for interaction with the DTM host (203) through a device driver (202). The DTM host (203) comprises a host business logic (204), a function adapter (205), and a function provider (206). The DTM host is configured to interact with a host function configuration database (208) and a new function (207).

Exemplary embodiments relating to a DTM host (203) decouple the primary DTM features and device specific new or advanced functions. New or advanced functions are additional functions beyond the primary functions of the DTM host (203). The function provider (206) provides support to new functions (207) without a need to change a corresponding DTM and accesses the function configuration database (208), which defines a list of functions (207) supported for a device type. The function adapter (205) adapts access of the new or advanced functions (207) to the DTM data store and the corresponding field device (201). The function provider (206) and function adapter (205) implement common interfaces designed to enable the new or advanced function (207) to be hosted by different hosts (203), regardless of whether they be a DTM or a standalone application.

The DTM host (203) (DTM or standalone application) passes respective protocol and device information to the function provider (206). The function provider (206) returns the list of functions available for the specific device model, based on the function configuration database (208). The list of functions may be uniquely associated with protocol and device information.

When the function (207) is to be executed, the DTM host (203) connects the function adapter (205) to the function provider (206) for local interaction with the DTM host business logic (204). The function provider (206) initiates the function (207) and connects the function adapter (205) to the function (207). Business logic (204) communicates with the field device (201) via the appropriate driver (202). Additionally, data from the function (207) may be saved to the DTM host (203) or the field device (201).

Figure 2B:
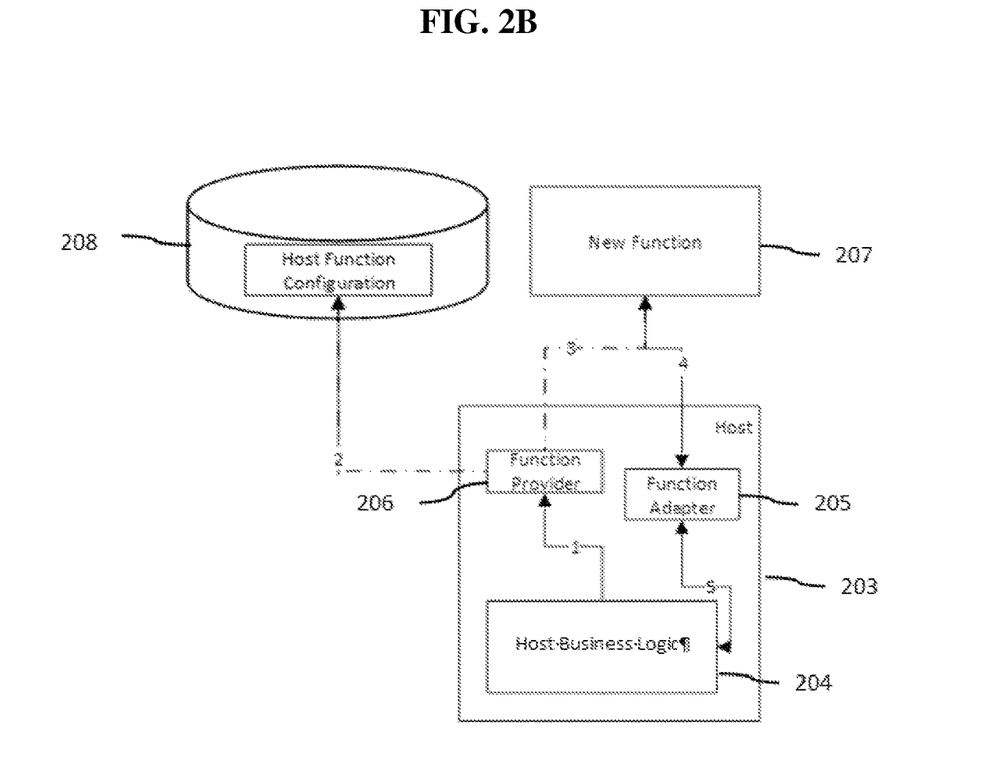

According to an exemplary embodiment in FIG. 2B, the system may not need an active connection to a field device to access some of the functionalities of the DTM. Some functions associated with the DTM may be usable in an offline mode where a field device is not connected. This allows for the ability to access particular features and functions of the DTM regardless of the connectivity of a field device.

Function Adapter

The function adapter (205) implements a designed interface to locally interact with the host business logic (204) of the DTM host (203). Each DTM host (203) would have a unique function adapter (205).

When a function (207) is launched, the function adapter (205) is provided to the function. When function (207) reads or writes data, the function (207) invokes the function adapter (205). The function adapter (205) is configured to communicate with the DTM host (203) to provide data to the DTM host (203). The DTM host (203) can get the data from the field device (201) or another source, through accessing the function adapter (205). The function adapter (205) has methods to communicate with the field device (201) or the DTM host (203), based on input from the function (207). The methods may be either generic methods to access the data or they may be specific methods dependent on the function (207).

Function Provider

The function provider (206) dynamically generates a list of available functions based on host and device information. The available functions are described in the function configuration database (208). The function provider is also the component that initiates a function (207).

When the DTM host (203) is launched, the function provider (206) is invoked to determine the list available functions. The function provider (206) reads the function configuration database (208) to identify the list of available functions (207). The function names are identified and listed as the available functions.

When user selects name of a function from the list, the frame application triggers the DTM host (203) to launch the function (207). The DTM host (203) requests the function provider (206) to launch the function (207). The function provider (206) reads the function configuration database (208) to determine a path of the function (207). The function provider (206) then accesses the function (207) based on the path and launches the function (207). The function is then sent to the DTM host (203) for control and operation.

Function Configuration Database

The function configuration database (208) provides descriptions of the functions, including assembly paths and state availability, based on protocol and device information.

According to some embodiments of the function configuration database (208), the function configuration database may be a file that describes information relating to advanced functions, such as:—
  name of function
  location of function component (library)
  condition for function (e.g. existence of a real time device connection)
  unique identifier of the function
  protocol supported by the function
  device supported by the function Alternatively, according to some embodiments of the function configuration database (208), one function configuration file is provided for each protocol or device.

In another embodiment, the function configuration database (208) may be a combination of both individualized configuration files and a single primary file containing specific information of the individualized configuration files.

The files can be stored in a same or a different location. The location can be at least one of a database, a folder, or a data store.

Exemplary file types for the function configuration database (208) can be ASCII, binary or encrypted type files. The file is created during development of the function and read during execution of the function.

Figure 3:
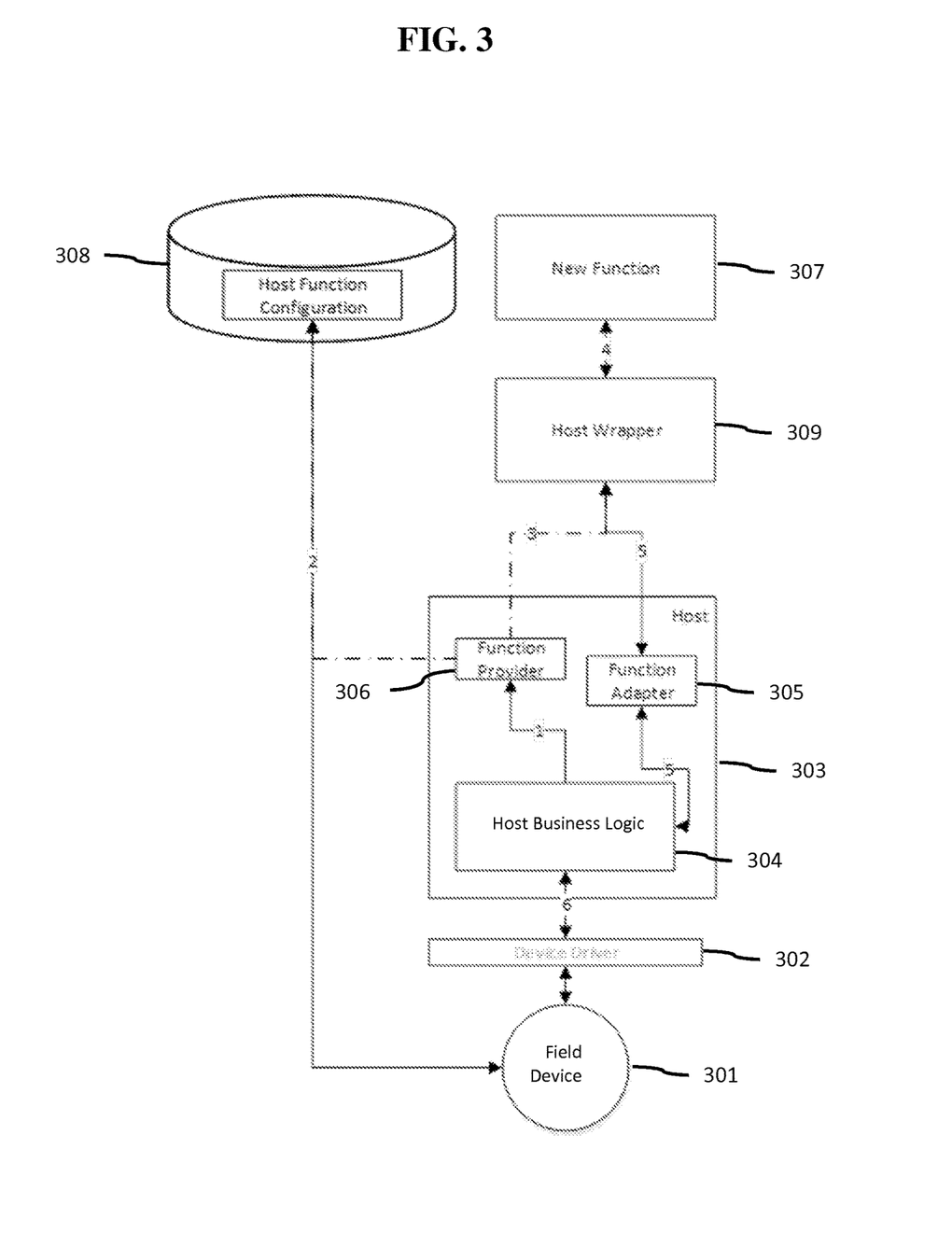
FIG. 3 illustrates an exemplary embodiment of a DTM host interaction with a new function and a host wrapper.

FIG. 3 shows an exemplary embodiment of a host interaction with a new function and a host wrapper.

Similar to the architecture shown in the exemplary embodiment of FIGS. 2A and 2B, an exemplary example in FIG. 3 shows a host wrapper (309) can be provided to construct host-specific data exchange request to communicate with host specific function adapter (305) of the DTM host (303).

In an embodiment, the DTM host (303) passes respective protocol and device information to the function provider (306). The function provider (306) returns the list of functions available for the specific device model, based on the function configuration database (308). The functions (307) may be uniquely associated with the protocol and device information.

The host wrapper (309) constructs host specific data exchange requests to communicate with a host-specific function adapter (305).

When the function (307) is to be executed, the DTM host (303) connects the function adapter (305) to the function provider (306) for local interaction with the DTM host business logic (304). The function provider (306) initiates the function (307) through the host wrapper (309) and connects the function adapter (305) to the function (307) through the host wrapper (309). Business logic (304) communicates with the field device (301) via the appropriate driver (302). Additionally, data from the function (307) may be saved to the DTM host (303) or the field device (301) through the host wrapper (309).

Figure 4:
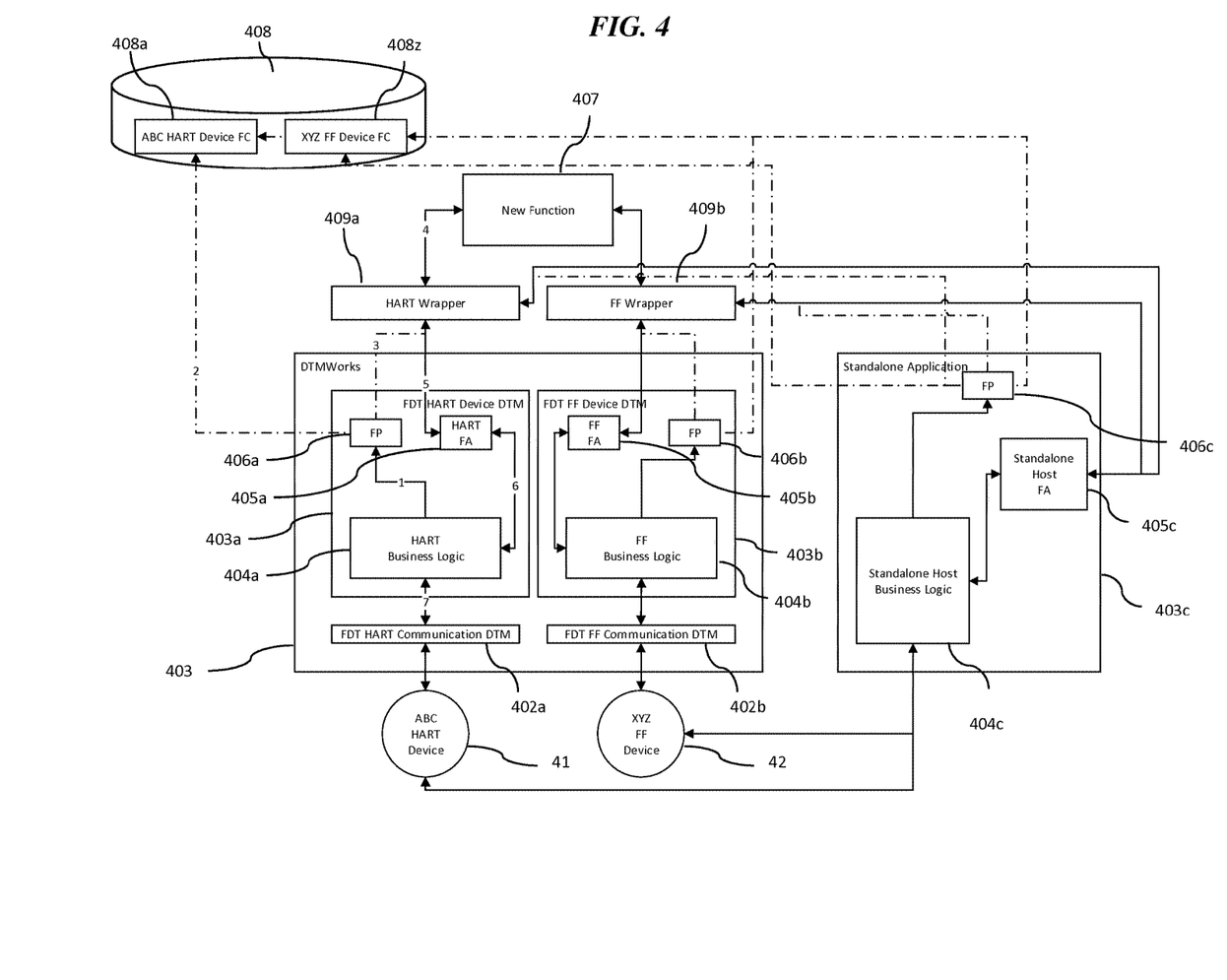
FIG. 4 illustrates an exemplary embodiment of a host interaction with a new function and a host wrapper for devices of different communication systems.

FIG. 4 shows an exemplary embodiment of a host interaction with a new function and a host wrapper for devices of different communication systems.

In particular, FIG. 4 shows an exemplary embodiment with both DTM hosts and a standalone host with two different field devices (41, 42) having different communication standards.

Exemplary embodiments relate to DTM hosts (403a, 403b) in [DTM WORKS] (403) and a standalone application host (403c). Each of the hosts has a respective business logic (404a, 404b, 404c), function adapter (405a, 405b, 405c), and function provider (406a, 406b, 406c). DTM hosts (403a, 403b) are respectively for different communication standard. Exemplary examples are [HART] and [FOUNDATION FIELDBUS]. Each DTM host further connects to a communication device driver (402a, 402b). Each communication standard has a respective host wrapper (409a, 409b).

The function configuration database (408) comprises a plurality of function configurations (408a, 408z) for functions operable with the field devices (41, 42).

When a new function (407) is selected by the user through one of the hosts (403a, 403b, 403c), the appropriate wrapper is used in order to provide communication between the function, host, and field device.

Figure 5:
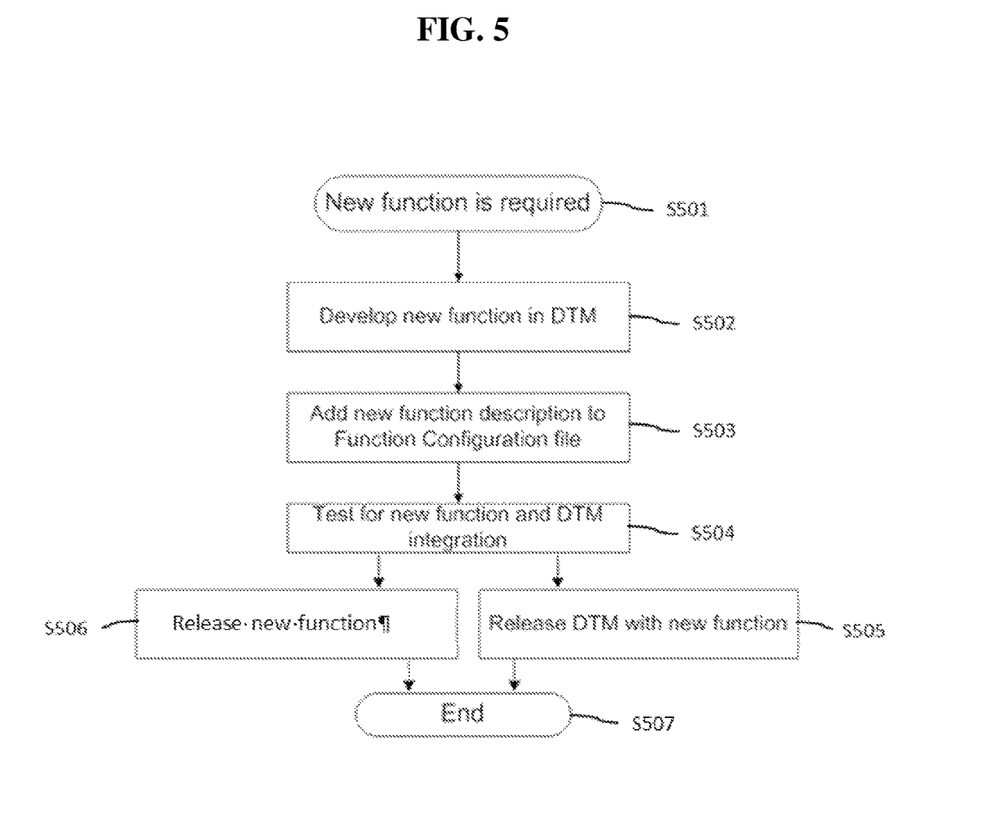
FIG. 5 is a flowchart of an exemplary embodiment of modifying a DTM in view of a new function.

FIG. 5 shows an exemplary embodiment of the present disclosure when a new function is necessary for a field device. When a new function is needed for a DTM (S501), a new function is developed in the DTM (S102) and the new function description is added to the Function Configuration file (S503). A test of the new function and its integration with the DTM is performed (S504), and then, if the DTM is acceptable, the DTM can be released for use with the new function (S505) to end the update process (S507).

In some embodiments, when a DTM is not released, a new function can instead be released (S506) instead of having the entire DTM released. The ability to only release a new function instead releasing the entire DTM can lower the development time as well as lessen storage requirements for upgrading.

In some embodiments, these DTMs may be program code stored in at least one non-transitory recordable medium and implemented by a processor.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

There is claimed:

1. A system comprising:
    a field device;
    a Device Type Manager (DTM) host for communicating with the field device, the DTM host comprising a host business logic, a function adapter, and a function provider;
    a function to be added to or modified in the DTM host; and
    a function configuration database, the function configuration database comprising a list of available functions,
    wherein:
    the DTM host separates the function to be added to or modified in the DTM host from primary functions of the DTM host,
    the function provider communicates with the function configuration database to look up the function, and
    the function adapter is configured to operate the function to be added to or modified in the DTM host with the host business logic.

2. The system according to claim 1, wherein the function is stored separately from the DTM host.

3. The system according to claim 1, wherein the function configuration database comprises path look up information for the function.

4. The system according to claim 1, wherein when the function to be added to or modified in the DTM host is to be executed, the host DTM connects the function adapter to the function provider for local interaction with the host business logic.

5. An apparatus comprising:
    a Device Type Manager (DTM) host that communicates with at least one field device, the DTM host comprising:
    a host business logic;
    a function adapter; and
    a function provider,
    wherein:
    the DTM host separates a function to be added to or modified in the DTM host from primary functions of the DTM host,
    the function provider is configured to communicate with a function configuration database, the function configuration database comprising a list of available functions, and
    the function adapter is configured to operate the function to be added to or modified in the DTM host with the host business logic.

6. The apparatus according to claim 5, wherein the function is stored separately from the DTM host.

7. The apparatus according to claim 5, wherein the function configuration database comprises path look up information for the function.

8. The apparatus according to claim 5, wherein the DTM host is a DTM or a standalone application.

9. The apparatus according to claim 5, wherein when the function to be added to or modified in the DTM host is to be executed, the host DTM connects the function adapter to the function provider for local interaction with the host business logic.

* * * * *